Aug. 27, 1968   F. A. MILLER   3,398,423
CORN CLEANER
Filed March 14, 1966   6 Sheets-Sheet 1

INVENTOR
FRANCIS A. MILLER
BY
ATTYS.

Aug. 27, 1968  F. A. MILLER  3,398,423
CORN CLEANER

Filed March 14, 1966  6 Sheets-Sheet 2

INVENTOR
FRANCIS A. MILLER
BY
ATTYS.

Aug. 27, 1968  F. A. MILLER  3,398,423
CORN CLEANER

Filed March 14, 1966  6 Sheets-Sheet 3

INVENTOR
FRANCIS A. MILLER
BY
ATTYS.

INVENTOR
FRANCIS A. MILLER
BY
ATTYS.

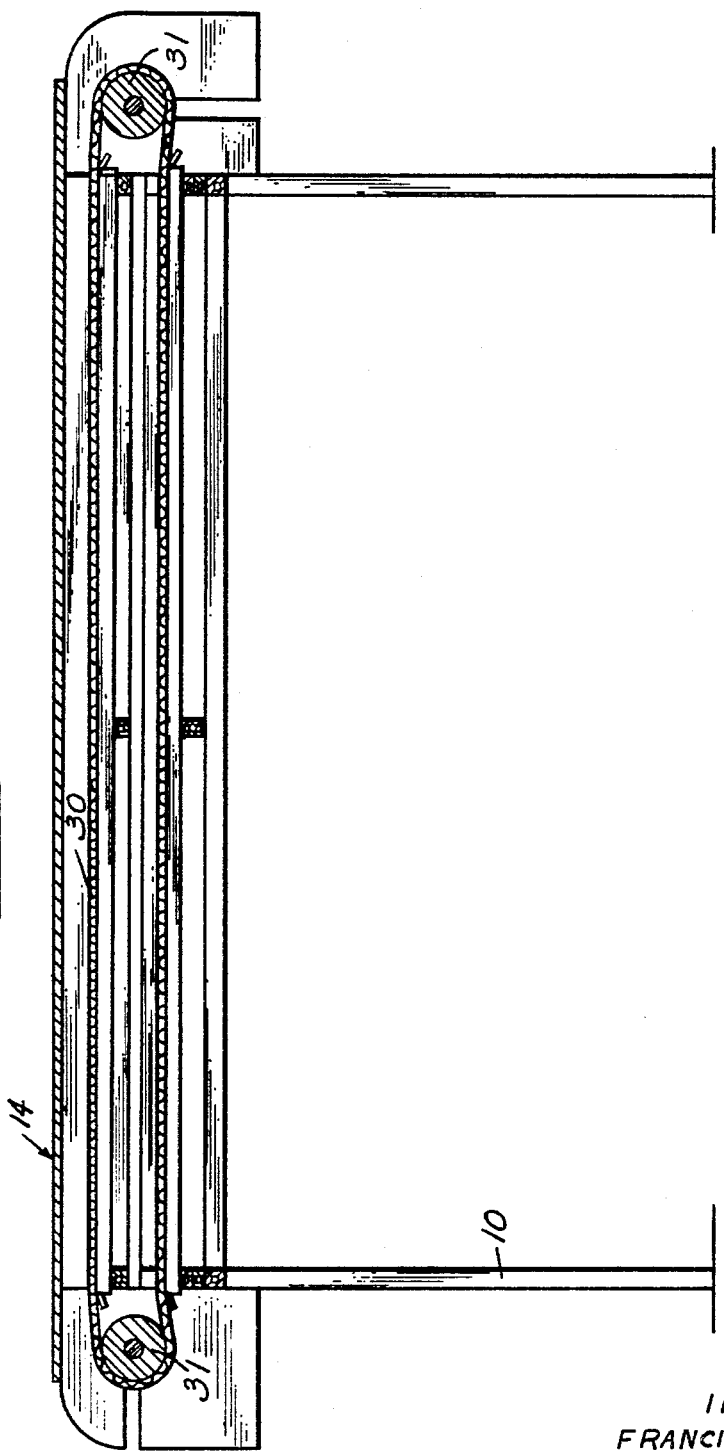

Aug. 27, 1968 F. A. MILLER 3,398,423
CORN CLEANER
Filed March 14, 1966 6 Sheets-Sheet 6
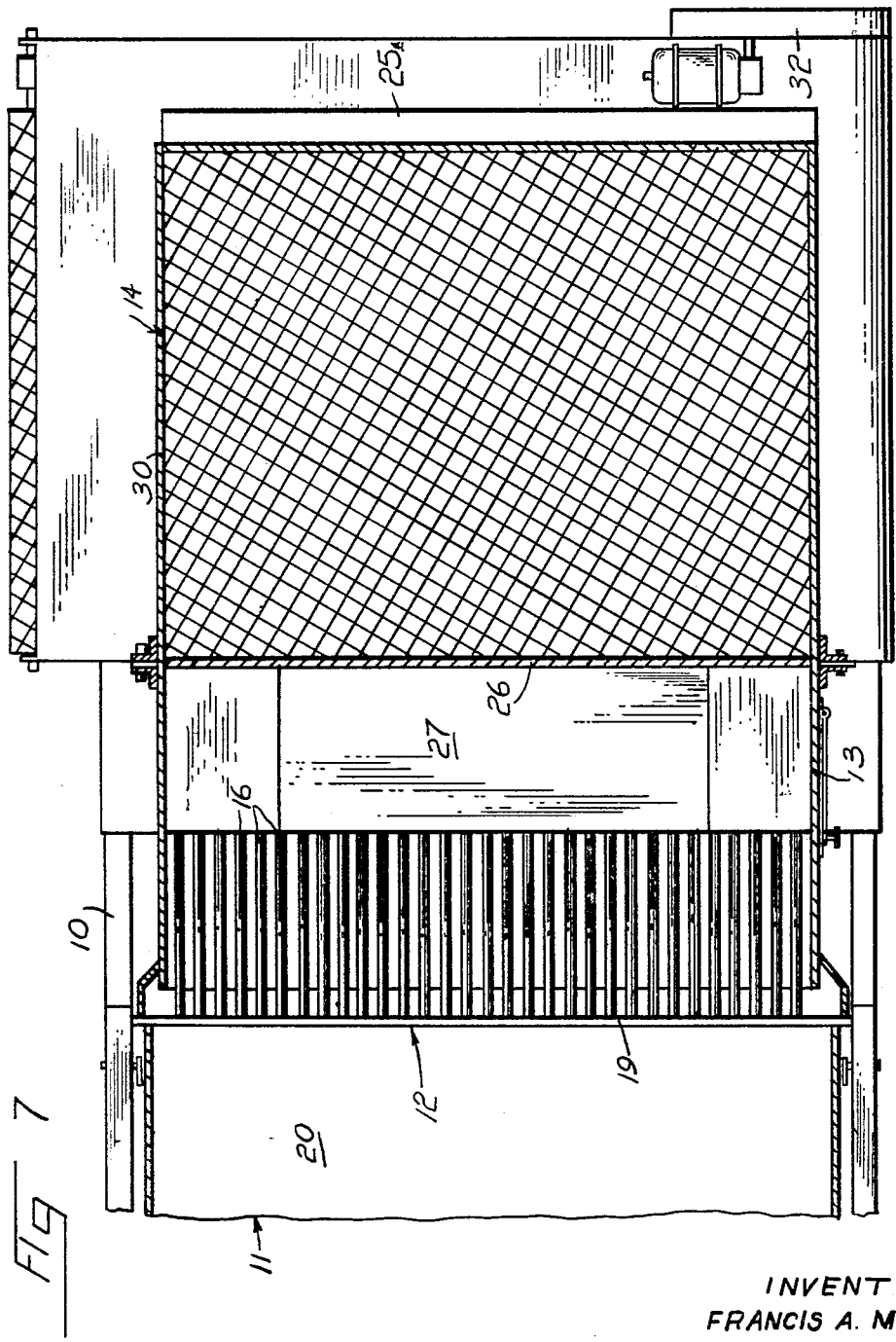
INVENTOR
FRANCIS A. MILLER
BY
*Wells & St.John*
ATTYS.

United States Patent Office 3,398,423
Patented Aug. 27, 1968

3,398,423
CORN CLEANER
Francis A. Miller, Milton-Freewater, Oreg., assignor to Key Equipment Company, Inc., Milton-Freewater, Oreg., a corporation of Oregon
Filed Mar. 14, 1966, Ser. No. 534,223
2 Claims. (Cl. 15—306)

ABSTRACT OF THE DISCLOSURE

A cleaning mechanism for separating waste matter from harvested corn. It utilizes a vibrating feed conveyor that delivers corn to an inclined perforated table where it is subjected to a perpendicular blast of air. Waste matter is then deflected by a hood onto a moving screen belt. The corn drops from the table into a hopper for further processing.

This invention relates to a cleaning mechanism for separating loose particles and waste from freshly harvested corn prior to storage or further processing of the corn ears.

The present invention is designed to remove, in a large volume operation, loose leaves, husks, and other waste materials collected with corn ears in a harvesting operation. This provides a preliminary cleaning apparatus for field runs which can be installed in the conveying line of a corn processing plant ahead of the huskers. The desirable good ears of corn are efficiently separated from loose husks, stalks, leaves, small immature ears and other miscellaneous waste. The resulting product free of such waste has been found to enable the efficiency of the husker operators to be increased making possible maximum plant production.

It is a first object of this invention to provide a corn cleaning apparatus for removing loose waste material from harvested corn prior to husking. The apparatus is designed for high capacity cleaning operations, readily adaptable to situations requiring twenty-five or forty tons of corn to be cleaned and handled each hour.

Another object of this invention is to provide such a cleaner which minimizes the possibility of damage to ears of corn, there being no direct mechanical operations carried out on the corn during the cleaning.

Another object of this invention is to provide a mechanically simple cleaning apparatus that can effectively separate large volumes of good corn from similarly large volumes of waste and loose material.

These and further objects will be further evident from the following disclosure, taken also with the accompanying drawings which illustrate one preferred form of the invention. It is to be understood that this form of the invention is only presented by way of example and that modifications could be made without deviating from the scope of the invention itself.

In the drawings:

FIGURE 6 is a fragmentary sectional view through the waste receiving conveyor apparatus only, taken substantially along line 6—6 in FIGURE 1; and FIGURE 7 is a fragmentary sectional view at an enlarged scale taken substantially along line 7—7 in FIGURE 1.

The apparatus described below is designed for field use to accomplish preliminary cleaning of harvested corn. The preliminary cleaning of the corn is desirable to remove leaves, stalks, small ears, husks and other loose material found in the harvested crop. This preliminary cleaning operation substantially reduces the time involved in husking the corn preliminary to further processing. The apparatus must be capable of handling large volumes of incoming corn, being commercially designed to handle volumes of twenty-five or forty tons per hour.

Figure 1:
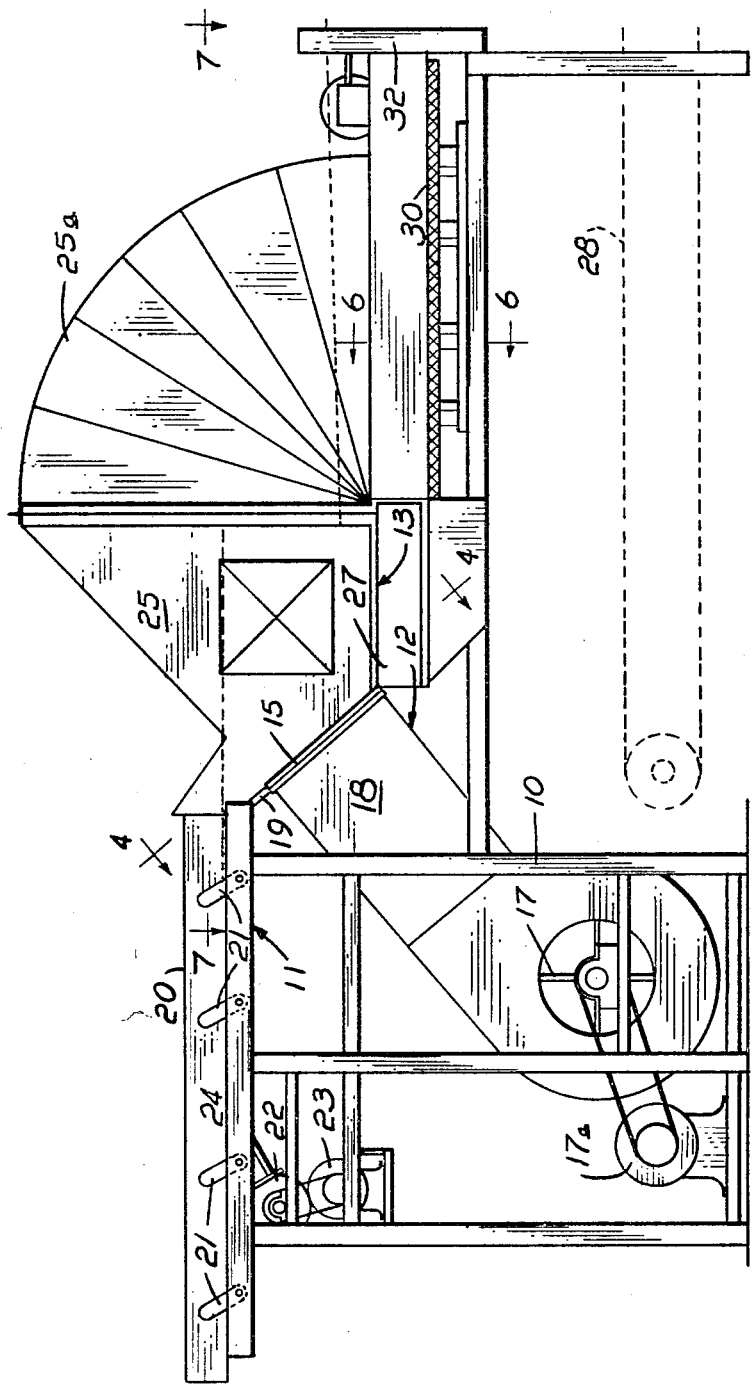
FIGURE 1 is a side elevation view of a cleaner constructed according to the invention.
Figure 3:
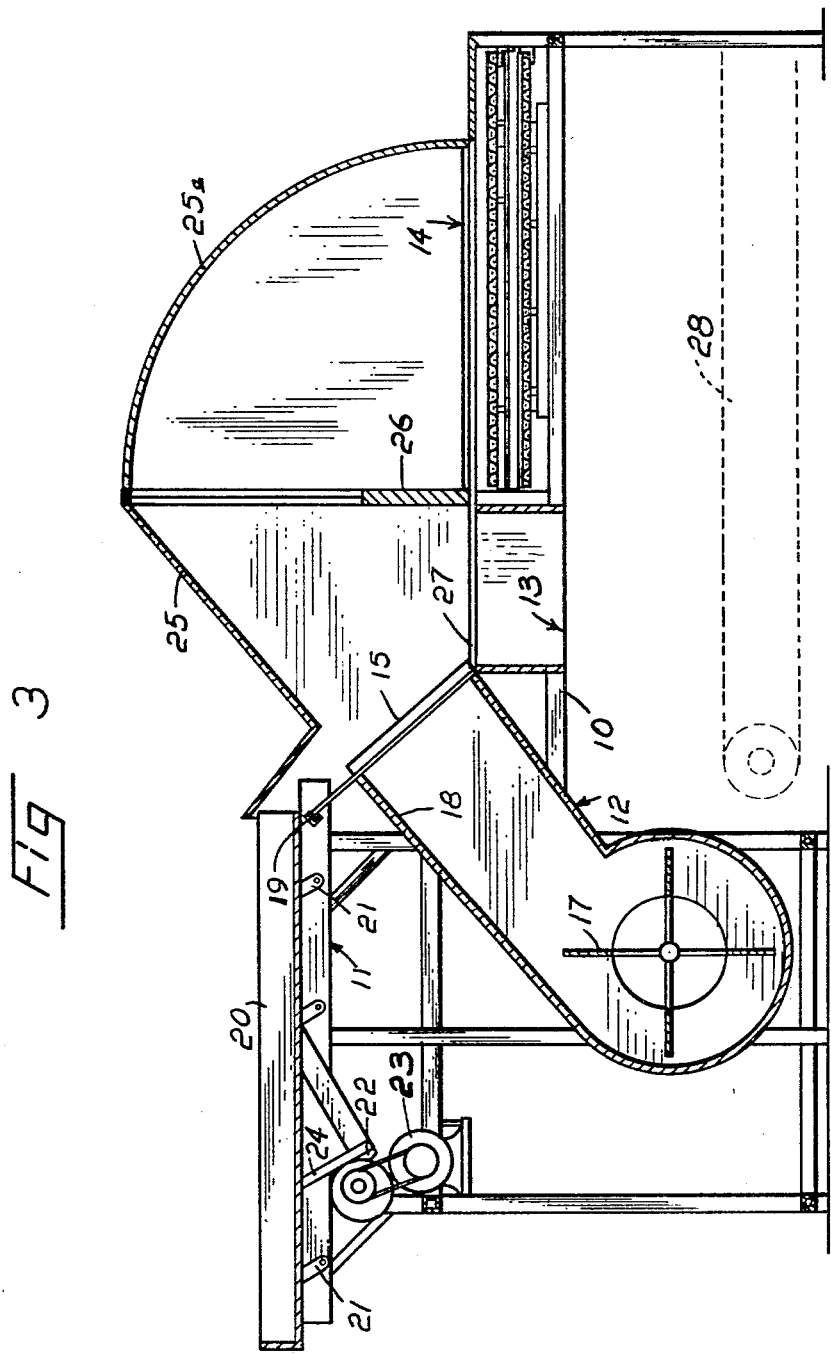
FIGURE 3 is a longitudinal sectional view taken along line 3—3 in FIGURE 2.
Figure 4:
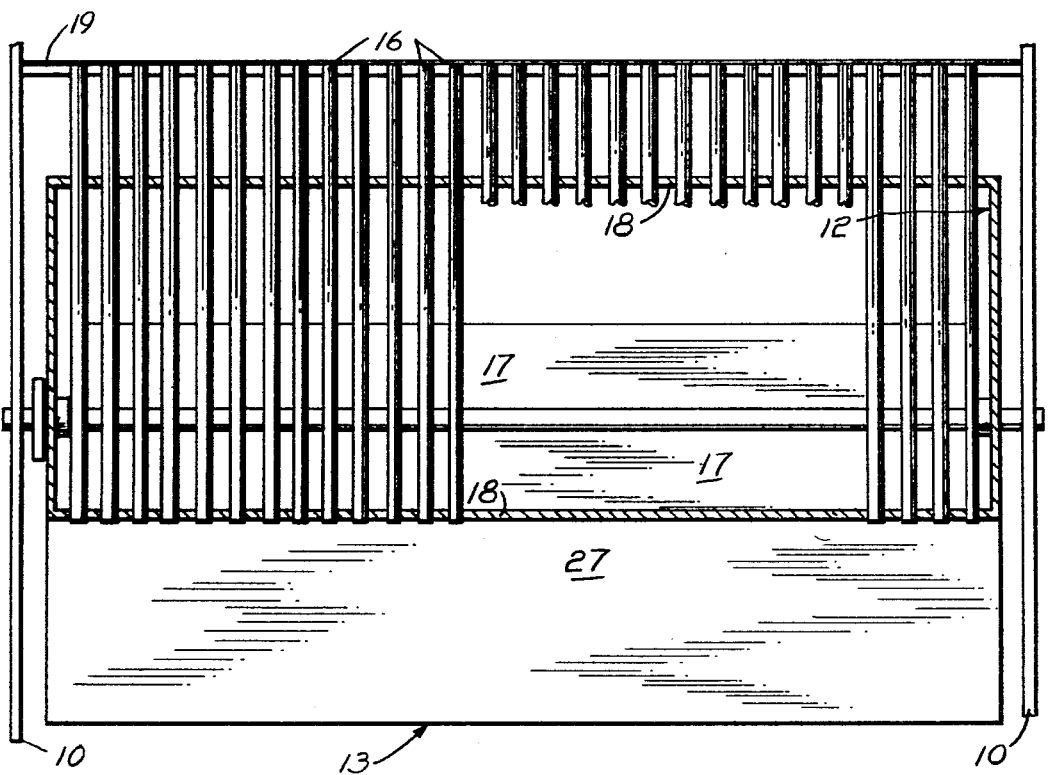
FIGURE 4 is a fragmentary sectional view of the separating apparatus as seen along line 4—4 in FIGURE 1.
Figure 5:
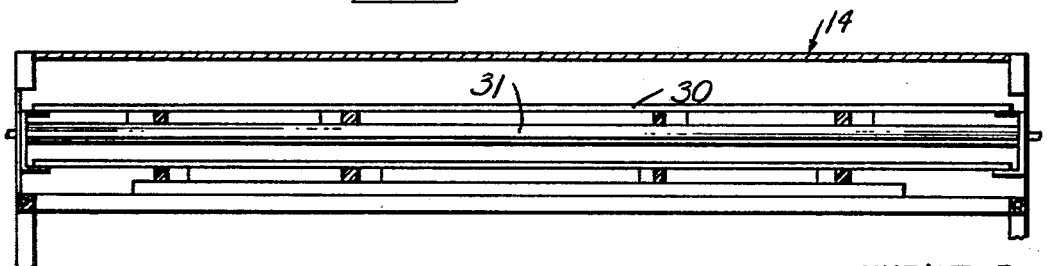
FIGURE 5 is a fragmentary sectional view taken along line 5—5 in FIGURE 2 at an enlarged scale.

As seen in the drawings, and particularly in FIGURES 1 and 3, the apparatus basically comprises a rigid supporting framework 10 that carries the various mechanisms which, in combination, accomplish the cleaning and separating steps. The first of these is a separating apparatus at the center of the machine, generally designated by the numeral 12. The harvested ears of corn are fed to the separating apparatus 12 by an infeed apparatus 11. The desired corn, minus loose materials, is received in a corn receiving apparatus denoted at 13. The trash or waste materials are collected in a waste receiving apparatus shown at 14.

In describing the mechanisms in detail, reference shall be made to the front and rear of the machine in relation to the flow of material handled thereby. The infeed or front end of the machine is shown at the left in FIGURES 1 and 3, while the outfeed or rear of the machine is shown at the right.

The separating apparatus 12 basically comprises an inclined table or screen 15 which is perforated so as to support material thereon while allowing free movement of air through the table. The structure utilized in the illustrated example comprises a series of transversely spaced bars 16, aligned in parallel longitudinal positions and inclined rearwardly and downwardly from an upper supporting cross member 19. The table 15 extends completely across the exit end of a lower housing 18 fixed to the framework 10. Within housing 18 is a conventional blower 17 powered by a motor 17a or other suitable power device.

The spacing between the bars 16 is less than the minimum diameter of corn ears to be handled thereon, so that the ears and other heavy articles cannot fall through the table 15 and into the blower 17. The blower 17 operates continuously, and it is therefore impossible for loose materials to enter the blower housing 18 through the table 15, since they will immediately be engaged by the upwardly directed air stream before they can fall between the bars 16.

Leading to the upper edges of bars 16 is a vibrating feed conveyor 20. The horizontal material supporting surface of conveyor 20 is movably carried on framework 10 by a series of pivotally mounted parallel support arms 21. A conventional mechanical shaker 22, utilizing eccentric weights, is mounted on a diagonal mounting plate 24 fixed to the lower surface of table 20. The shaker 22 is powered by a motor 23 on framework 10 and is designed to impart a constant shaking or vibratory motion to table 20 so as to spread material across table 20 and propel it rearwardly on table 20 until the material drops onto bars 16.

Figure 2:
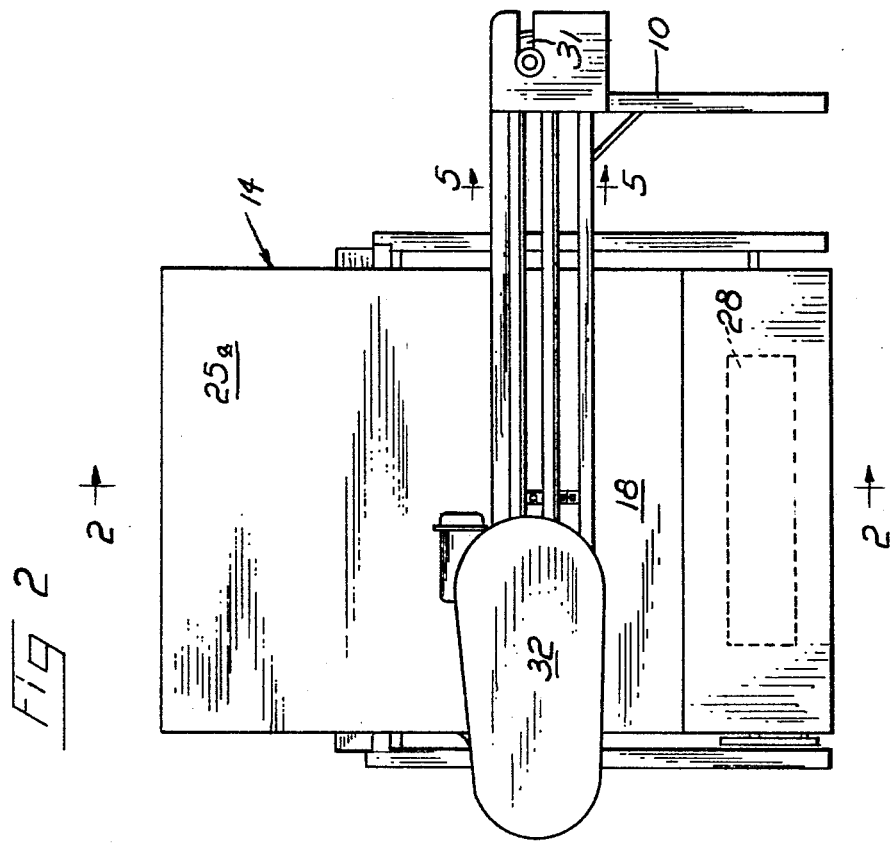
FIGURE 2 is a rear end view of the apparatus shown in FIGURE 1.

At the lower edge of table 15 is a hopper 27 designed to collect the desired ears of corn. Only the heavy solid ears of corn will slide completely downward along bars 16 and be received within the hopper 27. The corn can then be transferred to any desired receiving apparatus, a typical conveyor 28 being illustrated in FIGURES 1 through 3 in dashed lines.

As seen in FIGURE 3, the exit end of the blower housing 18 is in open communication with an upwardly extending hood 25 protruding rearwardly and upwardly from the inclined table 15. Hood 25 terminates in an arcuate rear section 25a to deflect the blast of air from blower 17 approximately 135 degrees to a vertical downward direction. At the rear edge of hopper 27 is a partial vertical barrier 26 extending transversely across the width of hood 25 (FIGURE 7). Barrier 26, which is preferably adjustable in a vertical plane, prevents heavy articles from being carried beyond hopper 27, so that ears of corn which might be momentarily deflected by the air stream from blower 17 will be deflected into hopper 27.

The waste and loose material which is carried over the barrier 26 by the air stream from blower 17 are deflected downwardly onto an endless screen conveyor 30. The conveyor 30, formed of suitable screen materials, is supported on rotatable rolls 31 on framework 10. It is powered by a conventional conveyor drive mechanism 32. The waste material can be carried from conveyor to any suitable receiving apparatus.

The above combination of elements provides efficient separation of the relatively heavy ears of good corn from loose waste material collected with the corn during a harvesting operation. The corn can be dumped onto the feed conveyor table 20 in large quantities by a constant infeed conveyor. It is spread on the table 20 prior to being deposited at the upper end of the inclined bars 16 on table 15. The constant high volume blast of air from blower 17 will instantly carry off loose leaves, stalks, debris and other waste material, permitting the desired ears of corn to fall into the hopper 27, where they can be received by any conventional conveyor or hopper apparatus. The waste material is then deflected downwardly by the hood 25 and is deposited upon the air screen conveyor 30, which filters the waste from the downwardly discharged air at the bottom rear section of the framework 10. This insures a clean operation, using outside air to feed blower 17 with the exhausted air being discharged downwardly toward the supporting floor surface. Wtih a constantly moving conveyor 30 to receive the waste, there is a continuous operation without the necessity of periodically changing filter bags or other receptacles. The apparatus efficiently cleans ears of corn so that the corn can be processed more efficiently in a husking machine, using less manual labor than is conventionally utilized.

Various modifications can be made in this structure without deviating from the invention, and for that reason only the following claims are intended to define the invention itself.

Having thus described my invention, I claim:

1. A corn cleaner for preliminary cleaning of corn ears to remove loose waste materials, comprising:
a rigid supporting framework;
table means mounted on said framework and having an upwardly facing top surface across which corn ears supported thereby and debris are moved from one longitudinal end of said table to its remaining longitudinal end, said top surface having a perforated configuration permitting air to travel therethrough;
a powered blower on said framework having an air outlet directed through said table means;
feed means for directing incoming ears of corn onto the top surface of said table means adjacent said one longitudinal end thereof;
corn receiving means in open communication with said remaining longitudinal end of said table means to receive discharged corn therefrom;
screened waste receiving means on said framework longitudinally adjacent to said corn receiving means, said waste receiving means comprising an upwardly facing screened surface on which waste materials are collected;
hooded deflecting means on said framework for directing air from said blower downwardly to said screened waste receiving means after passage thereof through said table means;
said screened waste receiving means comprising:
an endless conveyor having an air screen belt including a top horizontal flight directed outwardly from said framework;
said deflecting means comprising a hood over said table means and corn receiving means to direct the stream of air from said blower to the upper flight of said conveyor in a vertical downward direction.

2. An apparatus as set out in claim 1 further comprising:
an upright barrier mounted at the longitudinal edge of said corn receiving means opposite to said table means and protruding upwardly therefrom to prevent passage of ears of corn beyond said corn receiving means.

References Cited

UNITED STATES PATENTS

| | | | |
|---|---|---|---|
| 1,003,138 | 9/1911 | Hubner | 209—35 |
| 2,184,406 | 12/1939 | Troxler | 15—347 XR |
| 2,422,399 | 6/1947 | Erickson | 209—26 XR |
| 2,115,107 | 4/1938 | Hoffeld. | |
| 2,586,223 | 2/1952 | Harmon | 209—138 XR |
| 3,024,907 | 3/1962 | Carruthers | 209—136 |

FOREIGN PATENTS

| | | |
|---|---|---|
| 1,176,428 | 11/1958 | France. |
| 821,380 | 10/1959 | Great Britain. |

ROBERT W. MICHELL, *Primary Examiner.*